(12) United States Patent
Chen et al.

(10) Patent No.: US 7,635,811 B2
(45) Date of Patent: Dec. 22, 2009

(54) COMPUTER ENCLOSURE WITH REMOVABLE COVER

(75) Inventors: Yun-Lung Chen, Taipei Hsien (TW); Yu-Ming Xiao, Shenzhen (CN); Shao-Bin Zhang, Shenzhen (CN); Chuan-Lin Zheng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 267 days.

(21) Appl. No.: 11/766,109

(22) Filed: Jun. 21, 2007

(65) Prior Publication Data

US 2008/0174946 A1 Jul. 24, 2008

(30) Foreign Application Priority Data

Dec. 29, 2006 (CN) .......................... 2006 2 0145394

(51) Int. Cl.
*H02G 3/08* (2006.01)

(52) U.S. Cl. .......................... 174/50; 174/559; 174/67; 361/679.02; 361/724; 312/223.2

(58) Field of Classification Search .................. 174/50, 174/520, 66, 67, 500, 503, 559, 560, 561, 174/562; 220/3.2, 3.3, 3.9, 4.02; 361/600, 361/601, 683, 679.01, 679.02, 724, 752, 361/796, 679.55; 312/223.1, 223.2, 223.3
See application file for complete search history.

(56) References Cited

U.S. PATENT DOCUMENTS

| | | | | |
|---|---|---|---|---|
| 5,743,606 | A | * | 4/1998 | Scholder .................... 312/223.2 |
| 6,000,767 | A | * | 12/1999 | Liu et al. .................. 312/223.2 |
| 6,382,744 | B1 | | 5/2002 | Xiao |
| 6,909,047 | B2 | * | 6/2005 | Zhang .......................... 174/50 |
| 7,016,197 | B2 | * | 3/2006 | Kirner ......................... 361/752 |
| 7,193,855 | B2 | * | 3/2007 | Fan et al. ..................... 361/724 |
| 7,253,359 | B2 | * | 8/2007 | Chen et al. .................... 174/50 |
| 7,261,383 | B2 | * | 8/2007 | Fan et al. .................. 312/223.2 |
| 7,388,758 | B2 | * | 6/2008 | Chen et al. .................... 174/50 |
| 7,420,812 | B2 | * | 9/2008 | Chen et al. ................... 361/724 |
| 7,483,263 | B2 | * | 1/2009 | Chen et al. ............. 361/679.02 |
| 7,483,264 | B2 | * | 1/2009 | Chen et al. ............... 312/223.1 |
| 7,486,506 | B2 | * | 2/2009 | Chen et al. ............. 361/679.02 |

\* cited by examiner

*Primary Examiner*—Angel R Estrada
(74) *Attorney, Agent, or Firm*—Frank R. Niranjan

(57) ABSTRACT

A computer enclosure includes a chassis (10), a resilient locking member (20), a cover (40), and a resilient member (30). The chassis comprises a bottom plate (12) and a side plate (16). The side plate defines a through opening (162) therein and has a flange (164) with slits (166) defined therein. The locking member is secured on the bottom plate and abuts on the side plate. A locking tab (244) with a slanted surface (246) extends from the locking member. The cover has a plurality of hooks (42) formed thereon. A blocking tab (442) is formed on the cover. The resilient member is secured between the side plate of the chassis and the cover, and resiliently deforms when the blocking tab of the cover is engaged with the locking tab of the locking member to block the cover sliding in a second direction parallel to the side plate.

16 Claims, 6 Drawing Sheets

COMPUTER ENCLOSURE WITH REMOVABLE COVER

BACKGROUND

1. Technical Field

The present invention relates to computer enclosures, and more particularly to a computer enclosure with a cover conveniently assembled thereon.

2. General Background

A conventional computer enclosure usually includes a chassis, and a cover secured on the chassis. The chassis includes a pair of parallel side plates. Each of the side plates has a flange with a plurality of slits defined therein. The cover forms a plurality of hooks on opposite edges corresponding to the slits of the side plates. In assembly, the hooks of the cover are inserted into the slits of the side plates, and a latch member, such as a screw, is screwed into mounting holes defined in the chassis and the cover. Thus, the cover is secured on the chassis. However, it is very inconvenient to assemble or remove the cover.

What is needed, therefore, is a computer enclosure for conveniently assembling a cover on a chassis and remove the cover therefrom.

SUMMARY

A computer enclosure includes a chassis, a resilient locking member, a cover, and a resilient member. The chassis comprises a bottom plate and a side plate perpendicular to the bottom plate. The side plate defines a through opening therein and has a flange with a plurality of slits defined therein. The resilient locking member is secured on the bottom plate and abuts on the side plate. A locking tab with a slanted surface extends from the locking member. The cover has a plurality of hooks formed thereon for engaging into the corresponding slits of the chassis to prevent the cover moving in a first direction perpendicular to the bottom plate of the chassis. A blocking tab is formed on the cover. The resilient member is secured between the side plate of the chassis and the cover, and resiliently deforms when the blocking tab of the cover is engaged with the locking tab of the locking member to block the cover sliding in a second direction parallel to the side plate. When the locking member is resiliently deformed by an external force exerted thereon via the through opening of the side plate to disengage the hooks and the locking tab respectively from the slits and the blocking tab, the resilient member rebounds to slide the cover in the second direction, the slanted surface of locking tab of the locking member abuts against the blocking tab to lift the cover in the first direction.

Other advantages and novel features will be drawn from the following detailed description of preferred embodiments with attached drawings, in which:

DETAILED DESCRIPTION OF PREFERRED EMBODIMENTS

Figure 1:
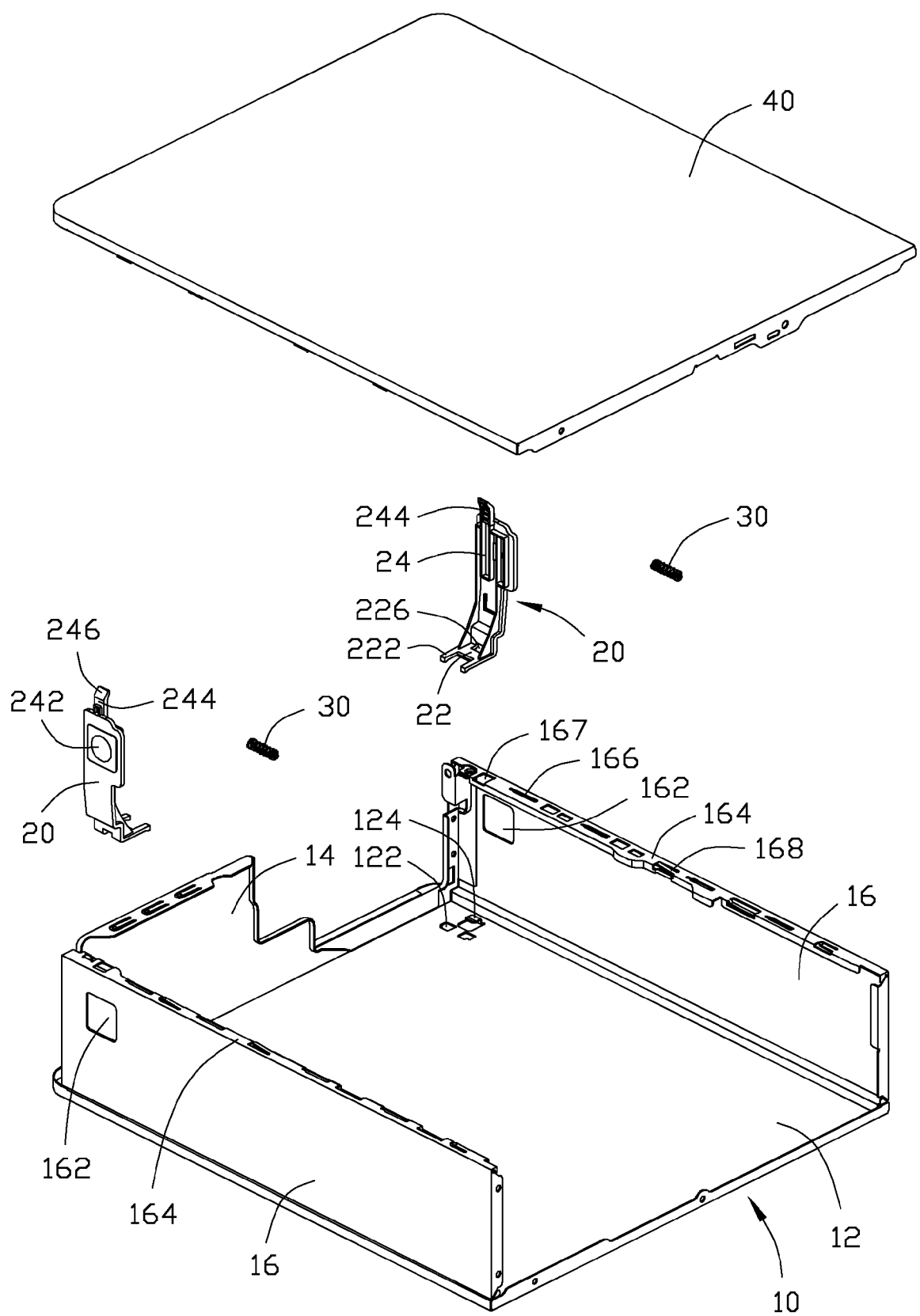
FIG. 1 is an exploded, isometric view of a computer enclosure in accordance with a preferred embodiment of the present invention, the computer enclosure including a chassis, a pair of locking members, two resilient members, and a cover.

Referring to FIG. 1, a computer enclosure of an embodiment of the present invention includes a chassis 10, a pair of locking members 20, two resilient members 30, and a cover 40.

The chassis 10 includes a bottom plate 12, a front plate 14, and a pair of side plates 16. The front plate 14 and the side plates 16 are perpendicularly bent up from adjacent edges of the bottom plate 12, respectively. Two positioning holes 122 are defined in the bottom plate 12, adjacent each of the side plates 16. An L-shaped positioning piece 124 is formed on an inner surface of the bottom plate 12 adjacent each of the side plates 16, between the two positioning holes 122 and the corresponding side plate 16. A through opening 162 is defined in each of the side plates 16 adjacent the front plate 14. A flange 164 is perpendicularly bent in from a top edge of each of the side plates 16. A plurality of slits 166 is defined in each of the flanges 164. A securing opening 167 is defined in each of the flanges 164 adjacent the front plate 14. A finger 168 is formed on each of the flanges 164 between two of the slits 166 by stamping, and extends toward the front plate 14.

Each of the locking members 20 includes a mounting portion 22, and a bent portion 24 capable of being resiliently deformed relative to the mounting portion 22 when a force exerted thereon. Two positioning tabs 222 extend from the mounting portion 22 in a horizontal direction and each has a protrusion projecting downward from a distal end thereof. A positioning hole 226 is defined in a junction between the mounting portion 22 and the bent portion 24, for the positioning piece 124 of the bottom plate 12 inserting therethrough. A protrusion 242 is formed on a surface of the bent portion 24, corresponding to the through opening 162 of each side plate 16. A locking tab 244 with a slanted surface 246 formed thereon extends from the bent portion 24 in a vertical direction.

Figure 2:
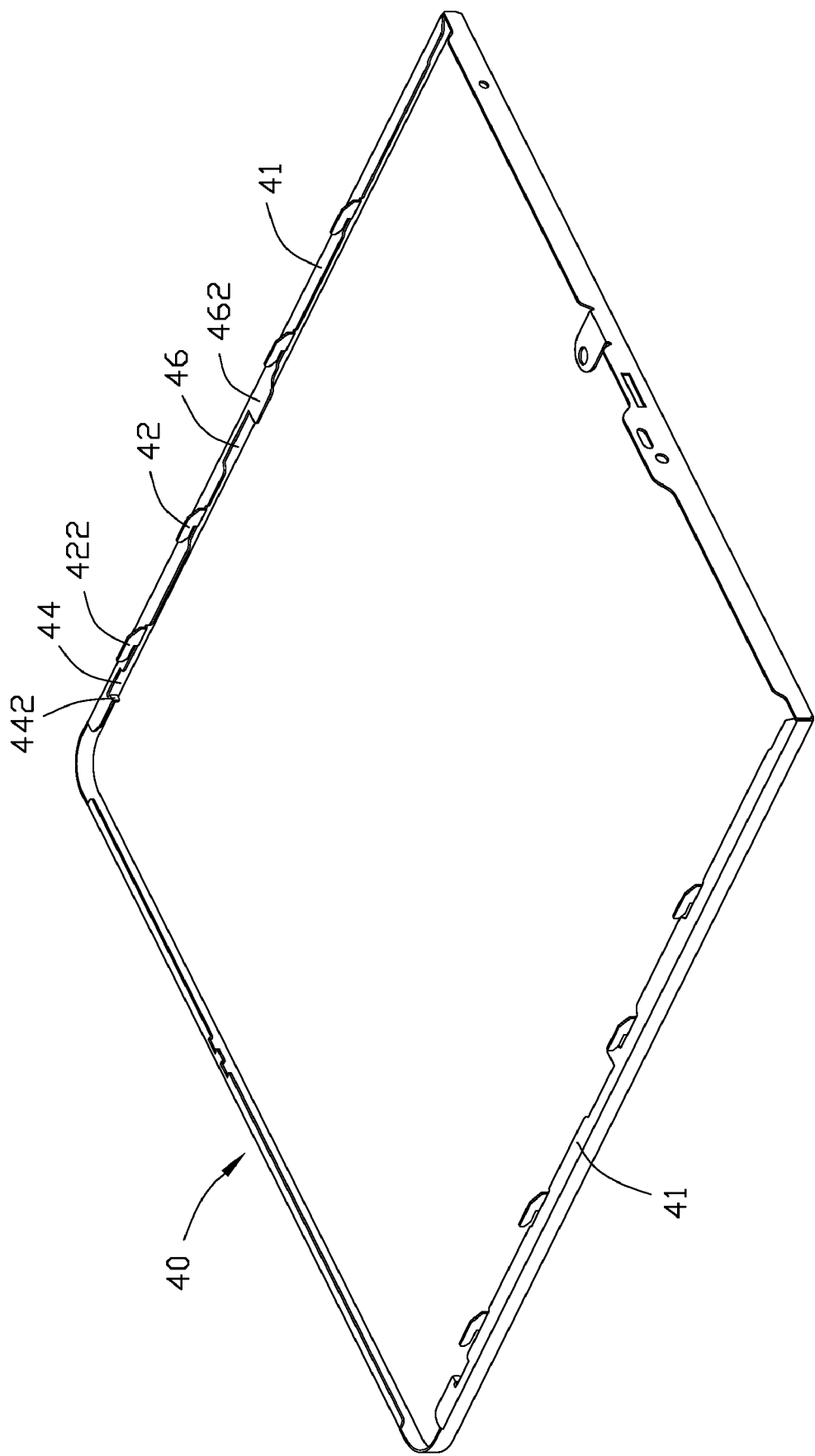
FIG. 2 is another isometric view of the cover of FIG. 1.

Referring to FIG. 2, the cover 40 has two flanges 41 respectively bent from opposite edges in a horizontal direction. A plurality of L-shaped hooks 42 is bent down in a vertical direction from each of the flanges 41, corresponding to the slits 166 of each flange 164 of the chassis 10. Each of the hooks 42 has an inserting portion 422 formed at a front end thereof. A gap (not labeled) is formed between the inserting portion 422 and the flange 41. A first cutout 44 is defined in each flange 41, corresponding to the securing opening 167 of each flange 164 of the chassis 10. A blocking tab 442 is formed on a front edge of each first cutout 44. A second cutout 46 is defined in each flange 41 corresponding to the finger 168 of each flange 164 of the chassis 10. Each of the second cutouts 46 has a pushing tab 462 formed on a rear edge thereof. The pushing tabs 462 are capable of being pushed by the resilient members 30 when removing the cover 40 from the chassis 10.

Figure 3:
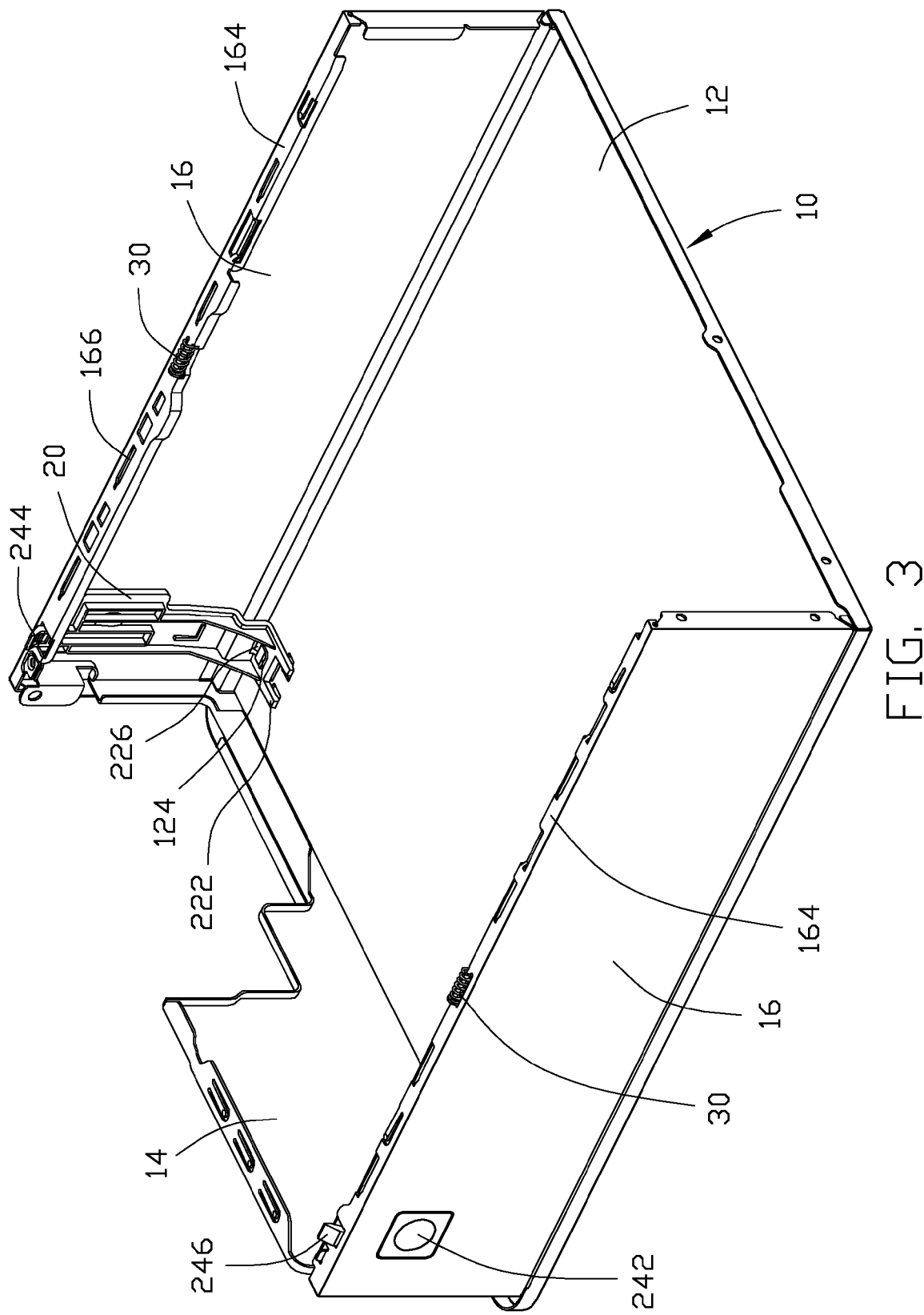
FIG. 3 is an assembled view of the chassis, the locking members, and the resilient members of FIG. 1.

Referring also to FIG. 3, the locking tabs 244 of the locking members 20 are inserted into the securing openings 167 of the side plates 16 of the chassis 10, respectively. The positioning pieces 124 of the bottom plate 12 are inserted into the corresponding positioning holes 226 of the locking members 20.

The protrusions of the positioning tabs 222 of each locking member 20 engage in the corresponding positioning holes 122 of the bottom plate 12. The locking members 20 are thus respectively secured on inner surfaces of the side plates 16 of the chassis 10. The two resilient members 30 are respectively secured around the fingers 168 of the side plates 16 of the chassis 10.

Figure 4:
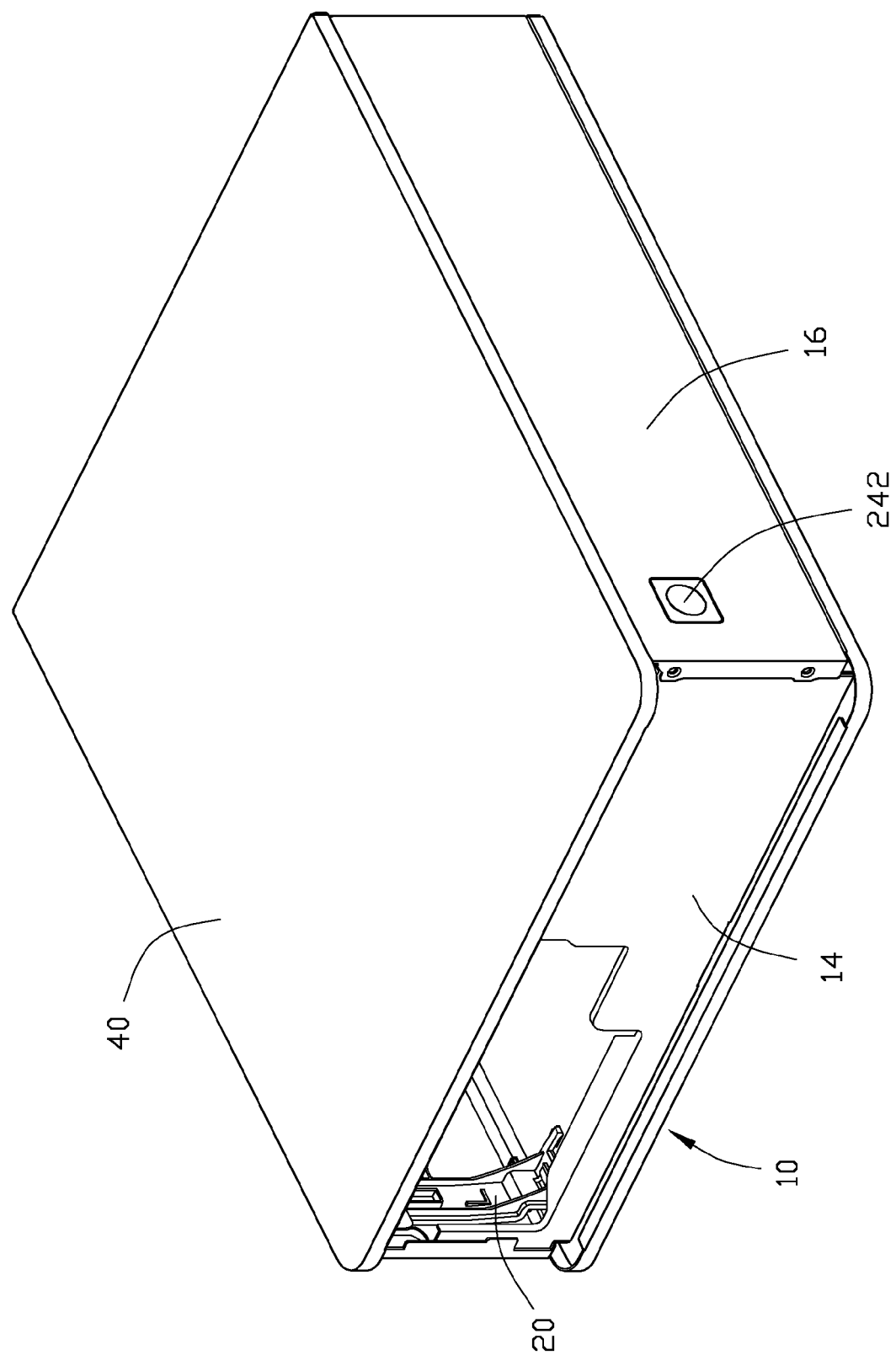
FIG. 4 is an assembled view of FIG. 1.
Figure 5:
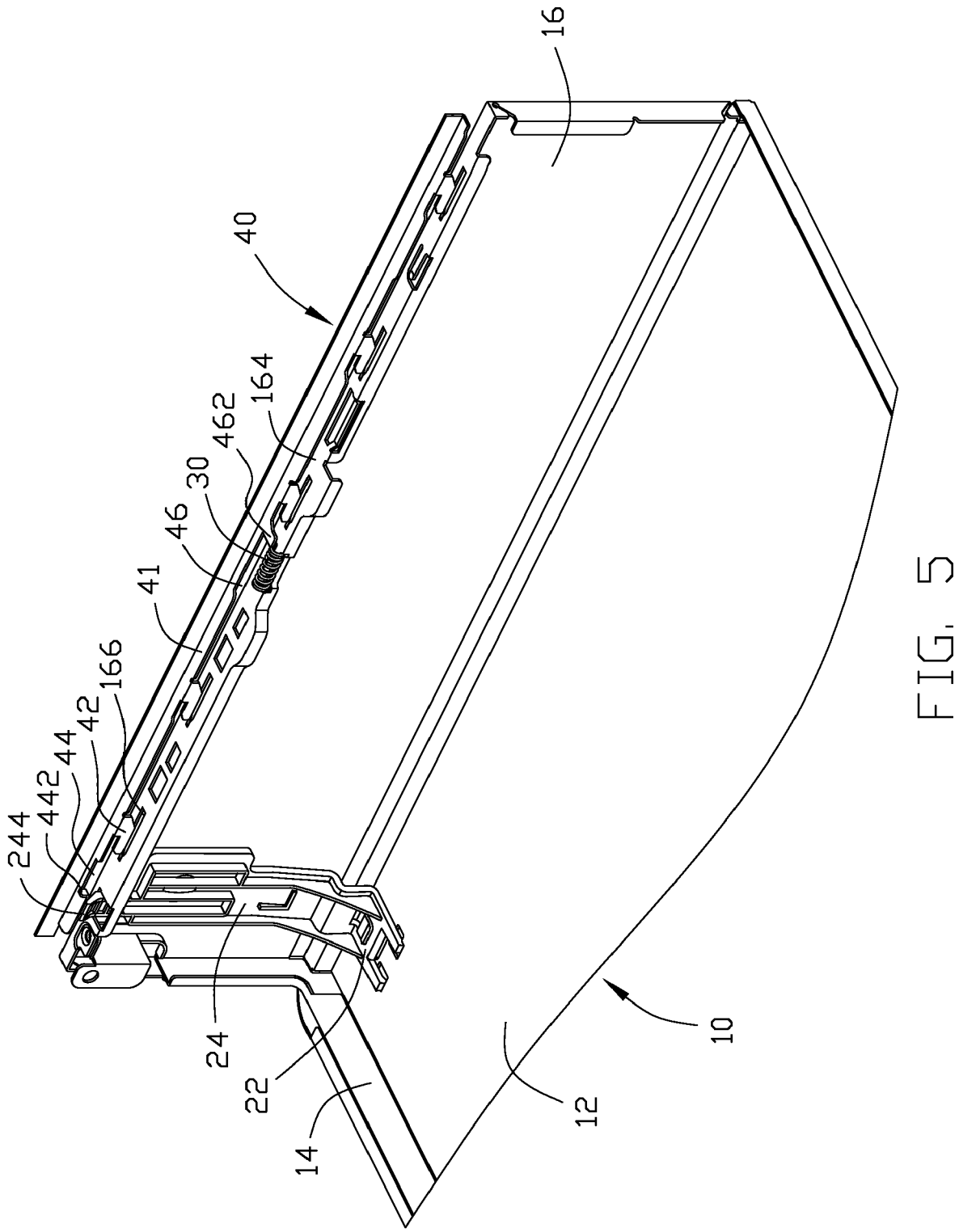
FIG. 5 is a cutaway view of FIG. 4, and showing the cover in an unlocked position in which the cover can be removed from the chassis.
Figure 6:
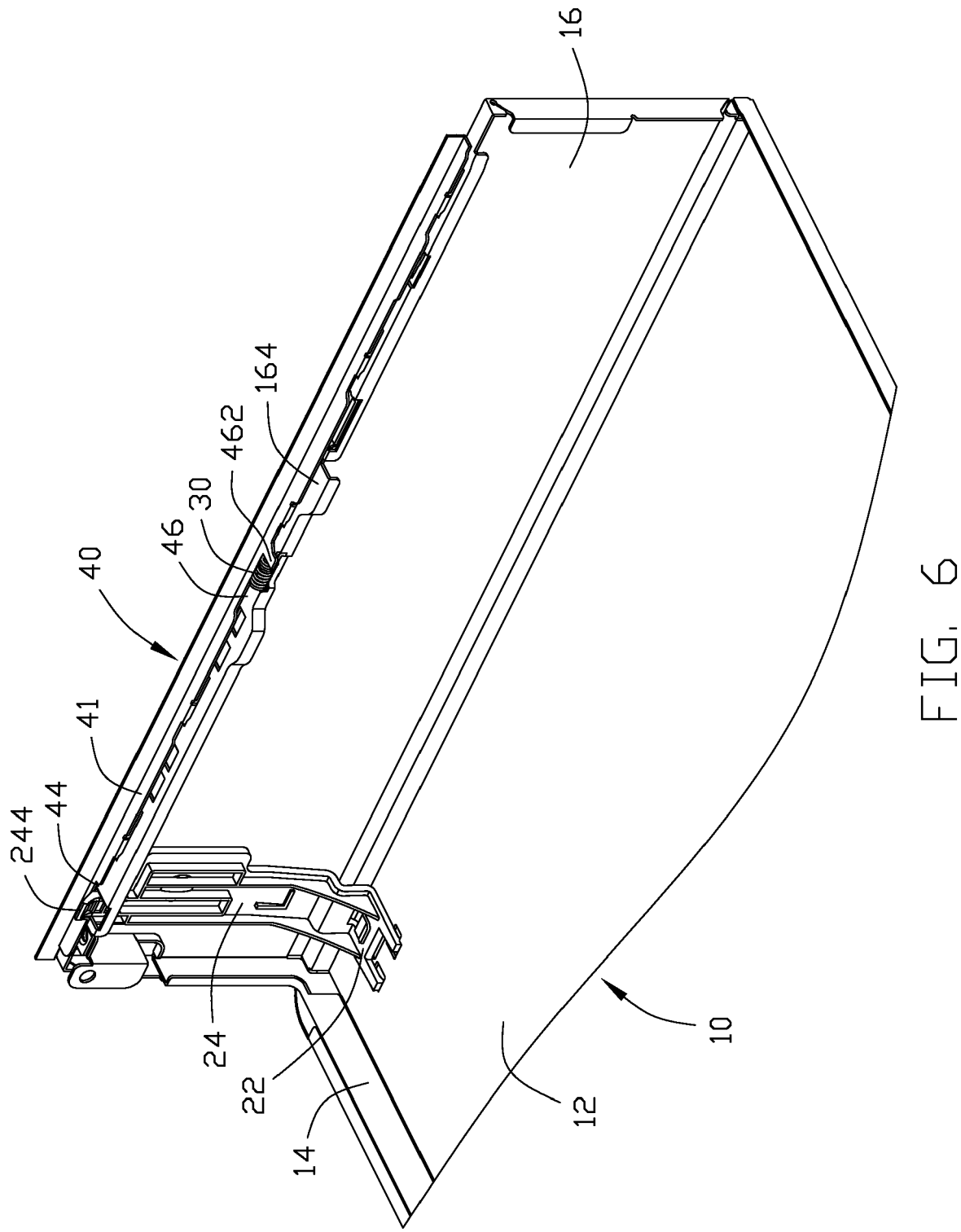
FIG. 6 is similar to FIG. 5, but showing the cover in a locked position in which the cover is secured mounted on the chassis.

Referring also to FIGS. 4-6, in assembling the cover 40 on the chassis 10, the hooks 42 of the cover 40 are inserted into the corresponding slits 166 of the flanges 164 of the side plates 16 of the chassis 10. The locking tabs 244 of the locking members 20 are respectively inserted into the first cutouts 44 of the cover 40, and positioned at a rear side of the blocking tabs 442. The pushing tabs 462 of the second cutouts 46 of the cover 40 are positioned at a rear side of the corresponding resilient members 30. The cover 40 is pressed down to resiliently deform the bent portions 24 of the locking members 20 via the blocking tabs 442 of the cover 40 depressing the slanted surfaces 246 of the locking tabs 244 of the locking members 20. The cover 40 is then pushed to slide on the flanges the flanges 164 of the chassis 10 toward the front plate 14 along a first direction perpendicular to the front plate 14 of the chassis 10. The resilient members 30 are resiliently compressed by the pushing tabs 462 of the cover 40. The blocking tabs 442 slide across the corresponding slanted surfaces 246 of the locking tabs 244 of the locking members 40, until a front edge of each slit 166 is engaged into the gap between one corresponding inserting portion 422 and the corresponding flange 41 of the cover 40. At this time, the bent portions 24 of the locking members 20 rebound to an original state, and the locking tabs 246 of the locking members 20 are respectively engaged into the corresponding first cutouts 44 of the cover to thereby engage with the blocking tabs 442 of the cover 40 to block the cover 40 sliding reverse to the first direction and the resilient members 30 rebounding to an original state.

In removing the cover 40, the bent portions 24 of the locking members 20 are pressed inward via an external force exerted on the protrusion 242 in a direction perpendicular to the side plates 16 the through openings 162 of the side plates 16 to resiliently deform, thereby releasing the blocking tabs 442 of the cover 40 from the locking tabs 244 of the locking members 40. The resilient members 30 rebound to their original states, and push the pushing tabs 462 to slide the cover 40 reverse to the first direction until the hooks 42 of the cover 40 abut on rear edges of the slits 166 of the side plates 16. The bent portions 24 of the locking members 20 are released. The slanted surfaces 246 of the bent portion 24 abut against the blocking tabs 442 of the cover 40, and action therebetween lifts the cover 40 up away from the side plates 16 along a second direction perpendicular to the bottom plate 12 of the chassis 10. Thus, the cover 40 is conveniently removed from the chassis 10.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure, comprising:
   a chassis comprising a pair of parallel side plates, each of the side plates having a flange, each of the flanges defining a slit therein;
   two resilient locking members respectively secured on the side plates, a locking tab with a slanted surface extending from each of the locking members;
   a cover having two hooks corresponding to the slits of the side plates, two blocking tabs formed on the cover, wherein when the cover is pressed to insert the hooks into the corresponding slits and resiliently deform the locking members with engagement between the blocking tabs and the slanted surfaces of the corresponding locking tabs, and slid in a first direction to engage the hooks into the corresponding slits of the side plates and to cause the blocking tabs slide across the locking tabs, the locking members rebound to cause the locking tab to block the blocking tabs to prevent the cover sliding reverse to the first direction;
   a resilient member secured between the cover and one of the flanges of the side plates, and resiliently deformed when the hooks are engaged into the corresponding slits of the side plates; and
   a pushing structure formed on the cover, the pushing structure abutting against the resilient member when the hooks are engaged into the corresponding slits of the side plates, and pushed by the resilient member to slide the cover reverse to the first direction when the blocking tabs are released from the locking tabs of the locking members.

2. The computer enclosure as described in claim 1, wherein the chassis comprises a bottom plate perpendicular to the side plates, the bottom plate defining two positioning holes therein respectively adjacent the side plates, each of the locking members comprising a mounting portion with a positioning tab extending therefrom for engaging into the corresponding positioning hole of the bottom plate.

3. The computer enclosure as described in claim 2, wherein two positioning pieces are formed on the bottom plate respectively adjacent the side plates, the mounting portion of each locking member defining a positioning hole therein for receiving the corresponding piece of the bottom plate.

4. The computer enclosure as described in claim 2, wherein each locking member comprises a bent portion capable of being resiliently deformed relative to the mounting portion, a protrusion being formed on the bent portion of each locking member, each side plate defining a through opening therein for receiving the protrusion of each locking member, the protrusion capable of being pressed in a direction perpendicular to the side plate to deform the bent portion inward to thereby disengage the locking tabs from the blocking tabs.

5. The computer enclosure as described in claim 4, wherein the locking tab extends from the bent portion of each locking member, the flange of each side plate defining a securing opening therein for the locking tab of each locking member extending therethrough.

6. The computer enclosure as described in claim 1, wherein a finger is formed on one of the cover and the flanges of the side plates for securing the resilient member thereon.

7. A computer enclosure, comprising:
   a chassis comprising a bottom plate and a side plate perpendicular to the bottom plate, the side plate defining a through opening therein and having a flange with a plurality of slits defined therein;
   a resilient locking member secured on the bottom plate and abutting on the side plate, a locking tab with a slanted surface extending from the locking member;
   a cover having a plurality of hooks formed thereon for engaging into the corresponding slits of the chassis to prevent the cover moving in a first direction perpendicular to the bottom plate of the chassis, a blocking tab formed on the cover; and a resilient member secured between the side plate of the chassis and the cover, the resilient member resiliently deforming when the blocking tab of the cover is engaged with the locking tab of the locking member to block the cover sliding in a second direction parallel to the side plate;

wherein when the locking member is resiliently deformed by an external force exerted thereon via the through opening of the side plate to disengage the hooks and the locking tab respectively from the slits and the blocking tab, the resilient member rebounds to slide the cover in the second direction, the slanted surface of locking tab of the locking member abuts against the blocking tab to lift the cover in the first direction.

8. The computer enclosure as described in claim 7, wherein the bottom plate defines two positioning holes therein adjacent the side plate, the locking member comprising a mounting portion with two positioning tabs extending therefrom for engaging in the positioning holes of the bottom plate respectively.

9. The computer enclosure as described in claim 8, wherein a positioning piece is formed on the bottom plate adjacent the side plate, the mounting portion of the locking member defining a positioning hole therein for receiving the corresponding piece of the bottom plate.

10. The computer enclosure as described in claim 8, wherein the locking member comprises a bent portion capable of being resiliently deformed relative to the mounting portion, a protrusion being formed on the bent portion of the locking member and extending into the through opening of the side plate, the protrusion capable of being pressed in a direction perpendicular to the side plate to deform the bent portion inward to thereby disengage the locking tabs from the blocking tabs.

11. The computer enclosure as described in claim 10, wherein the locking tab extends from the bent portion of the locking member, the flange of the side plate defining a securing opening therein for the locking tab of the locking member extending therethrough.

12. The computer enclosure as described in claim 7, wherein a finger is formed on the flange of the side plate, for securing the resilient member thereon.

13. The computer enclosure as described in claim 12, wherein a cutout is defined in the cover, a pushing tab being formed on an edge of the cutout and urged by the resilient member to slide the cover in the second direction when the locking member is deformed to disengage from the locking tab of the locking member.

14. A computer enclosure comprising:

a chassis comprising a bottom plate and a pair of side plates extending from opposite sides of the bottom plate, each of the side plates having a flange bent therefrom and parallel to the bottom plate, the flange defining a plurality of slits therein, one of the side plates defining a through opening;

a locking member secured in the chassis adjacent to the one of the side plates, the locking member comprising a resilient bent portion having a locking structure formed at a distal end thereof;

a cover slidably attached to the chassis in a first direction, the cover comprising a plurality of hooks formed at opposite sides thereof, a blocking tab formed on the cover and blocked by the locking tab in a second direction reverse to the first direction to thereby prevent the cover sliding away from the chassis in the second direction; and a resilient member attached between the chassis and the cover; wherein the bent portion is deformable inward by an external force via the through opening exerted thereon to move the locking structure inward to release the blocking tab such that the resilient member rebounds and pushes the cover to slide in the second direction to disengage the hooks from the respective pieces.

15. The computer enclosure as described in claim 14, wherein the locking structure has a slanted surface formed thereon, when the cover is attached to the chassis and pressed down, the blocking tab presses on the slanted surface to deform the bent portion inward and the cover is slid to cause the blocking tab slide over the locking structure to be blocked by the locking structure in the second direction.

16. The computer enclosure as described in claim 14, wherein one of the flanges forms a finger, the resilient member comprises a spring attached around the finger, and the spring is compressed between the flange and the cover.

* * * * *